United States Patent
Eisenhour et al.

(10) Patent No.: US 7,159,788 B2
(45) Date of Patent: Jan. 9, 2007

(54) INTERIOR TEMPERATURE SENSING METHOD AND APPARATUS

(75) Inventors: Ronald S. Eisenhour, West Bloomfield, MI (US); Chris G. Oehring, Monroe, MI (US)

(73) Assignees: Nissan Technical Center North America, Inc., Farmington Hills, MI (US); Visteon Global Technologies, Inc., Dearborn, MI (US)

( * ) Notice: Subject to any disclaimer, the term of this patent is extended or adjusted under 35 U.S.C. 154(b) by 89 days.

(21) Appl. No.: 10/797,630

(22) Filed: Mar. 11, 2004

(65) Prior Publication Data

US 2005/0199735 A1 Sep. 15, 2005

(51) Int. Cl.
- *F24F 11/23* (2006.01)
- *B60H 1/00* (2006.01)
- *G01K 5/00* (2006.01)

(52) U.S. Cl. .............. 236/1 C; 236/91 C; 374/198; 374/208; 62/244

(58) Field of Classification Search .............. 236/1 C, 236/91 C; 374/198, 208; 62/244
See application file for complete search history.

(56) References Cited

U.S. PATENT DOCUMENTS

| | | | |
|---|---|---|---|
| 4,685,508 A | | 8/1987 | Iida |
| 5,137,370 A | * | 8/1992 | McCulloch et al. ........ 374/173 |
| 6,320,450 B1 | * | 11/2001 | Lee et al. ................... 327/513 |
| 6,341,495 B1 | | 1/2002 | Oberberger et al. |
| 6,709,155 B1 | * | 3/2004 | Knittel et al. ................ 374/141 |
| 2004/0163395 A1 | * | 8/2004 | Ichishi et al. ................. 62/126 |
| 2004/0223534 A1 | * | 11/2004 | Trapp et al. ................ 374/172 |

OTHER PUBLICATIONS

U.S. Appl. No. 10/373,202, filed Feb. 26, 2003, Eisenhour.

* cited by examiner

*Primary Examiner*—Marc Norman
(74) *Attorney, Agent, or Firm*—Foley & Lardner LLP (57) ABSTRACT

A method and apparatus for more accurately determining the room temperature of air in an automobile cabin by automatically determining the room temperature of air in an automobile based on one or more of a temperature value for solid mass surrounding a temperature sensor, an outlet temperature value for outlet air leaving a conditioned air outlet vent, an air temperature value for air measured by an air temperature sensor, and a blending factor value based on estimated percentages of room temperature air and outlet air present in the air measured by the air temperature sensor.

53 Claims, 1 Drawing Sheet

INTERIOR TEMPERATURE SENSING METHOD AND APPARATUS

BACKGROUND OF THE INVENTION

Air temperature sensors inside the cabin of an automobile are used to obtain a measurement of the room temperature inside the cabin of an automobile. However, in some situations, the air temperature value obtained from the air temperature sensor is not necessarily indicative of the room temperature of the air inside the cabin of the automobile.

Causes of inaccuracy in the determination of room temperature include, but may not be limited to, heat sources near the sensor, heat capacitance of nearby objects, outlet temperature air flowing into the sensor and even sun load striking the sensor location.

Differences between the actual room temperature and the air temperature value obtained from the temperature sensor may be present for a number of reasons, one of which is that the air that is used by the sensor to obtain the temperature reading may exchange heat with mass surrounding the temperature sensor. For example, if the temperature sensor is located underneath a dashboard and the material of the dashboard is at 100 degrees F. (because, for example, the car has been sitting in a hot garage during the summer) but the room temperature of the air inside the cabin is 70 degrees F. (because, for example, the air conditioner, which has recently been started, has been operating to deliver cooler air inside the cabin), the air immediately surrounding the temperature sensor (i.e., air that is used by the sensor to obtain a temperature measurement) may be at a temperature in between the room temperature (70 degrees F.), and the temperature of the dashboard (100 degrees F.), because as the air from the cabin moves over the dashboard and into the temperature sensor, heat from the dashboard is exchanged with the air, resulting in an increase in temperature of the air sampled by the sensor from the room temperature value.

As noted above, the temperature of the air that is used by the temperature sensor may also be different from the actual room temperature value because the air sampled by the temperature sensor may, in actuality, be a blend of air at the room temperature of the automobile (that is, in the example given above, 70 degrees F.) and air at a temperature of the outlet temperature of air leaving the conditioned air outlet vent. That is, for example, in instances where an outlet vent in the automobile is supplying conditioned air to the cabin at a temperature that is different from the actual room temperature, a portion of this conditioned air may find its way directly to the temperature sensor, thus influencing the temperature reading of the temperature sensor. By way of example, if air is being directed into the cabin at 60 degrees F., the air sampled by the air temperature sensor may include both air at 70 degrees F. (the room temperature) and air at 60 degrees F. (the outlet temperature).

Automatic climate control systems require reliable accurate information regarding the vehicle cabin interior temperature, in order to achieve the occupant's comfort objectives. The above discussed corrupting influences present challenges in appropriately reaching and maintaining target comfort levels in the vehicle.

Symptoms of these problems include room temperature over-shooting (passing the target), drifting of the interior temperature during long driving, poor warm-up and cool down rates.

Thus, there is a need to more accurately determine the room temperature in a cabin of an automobile by addressing the effect of various thermal influences on a temperature sensor.

SUMMARY OF THE INVENTION

In a first embodiment of the invention, there is a method of more accurately determining the room temperature of air in an automobile cabin by a temperature sensor, comprising, automatically determining the room temperature of air in an automobile based on an air temperature value for air measured by the air temperature sensor which has been adjusted based upon at least one of the following factors: a) a temperature value for solid mass surrounding the temperature sensor; and b) an outlet temperature value for outlet air leaving a conditioned air outlet vent and a blending factor value based on estimated percentages of room temperature air and outlet air present in the air measured by the air temperature sensor.

In another embodiment of the present invention, there is a method for automatically controlling the climate in a cabin of an automobile, comprising automatically determining the room temperature of air in the automobile as discussed above, and providing conditioned air to the cabin from the conditioned air outlet vent at an outlet temperature and mass flow rate determined at least based on the automatically determined room temperature of air in the automobile.

In another embodiment of the present invention, there is a method for more accurately determining the room temperature of air in an automobile cabin, comprising, automatically determining the room temperature of air in an automobile cabin by adding or subtracting an error value to/from a temperature value of air measured by an air temperature sensor, the error value being based on a temperature value for solid mass surrounding a temperature sensor.

In another embodiment of the present invention, there is a method for more accurately determining the room temperature of air in an automobile cabin, comprising, automatically determining the room temperature of air in an automobile cabin by adding or subtracting an error value to/from a temperature value of air measured by an air temperature sensor, the error value being based on an outlet temperature value for outlet air leaving a conditioned air outlet vent and a blending factor value based on estimated percentages of room temperature air and outlet air present in the air measured by the air temperature sensor.

In another embodiment of the present invention, there is a room temperature sensor assembly for more accurately determining the room temperature of air in an automobile cabin, comprising, an electronic processor, wherein the processor is adapted to automatically determine the room temperature of air in an automobile based on an air temperature value for air measured by an air temperature sensor which has been adjusted based upon at least one of the following factors: a) a temperature value for solid mass surrounding the temperature sensor, and b) an outlet temperature value for outlet air leaving a conditioned air outlet vent and a blending factor value based on estimated percentages of room temperature air and outlet air present in the air measured by the air temperature sensor.

In another embodiment of the present invention, there is a room temperature sensor assembly for more accurately determining the room temperature of air in an automobile cabin, comprising, an electronic processor and a memory, wherein the memory stores at least one algorithm based on an equation to automatically determine the room temperature of air in an automobile, the equation being based on variables including: an air temperature value for air measured by an air temperature sensor, a temperature value for solid mass surrounding a temperature sensor, an outlet temperature value for outlet air leaving a conditioned air outlet vent, a blending factor value based on estimated percentages of room temperature air and outlet air present in the air measured by the air temperature sensor, a local heat transfer convection coefficient and an area product of the solid mass surrounding the temperature sensor, a product of the mass flow rate and the enthalpy of air sampled by the temperature sensor, wherein the electronic processor is adapted to automatically determine the room temperature of air in an automobile utilizing the algorithm.

In another embodiment of the present invention, there is an apparatus for practicing the above and below methods in an automobile.

Another embodiment of the invention includes practicing the above and below methods in an automobile.

DETAILED DESCRIPTION OF THE PREFERRED EMBODIMENTS

Figure 1:
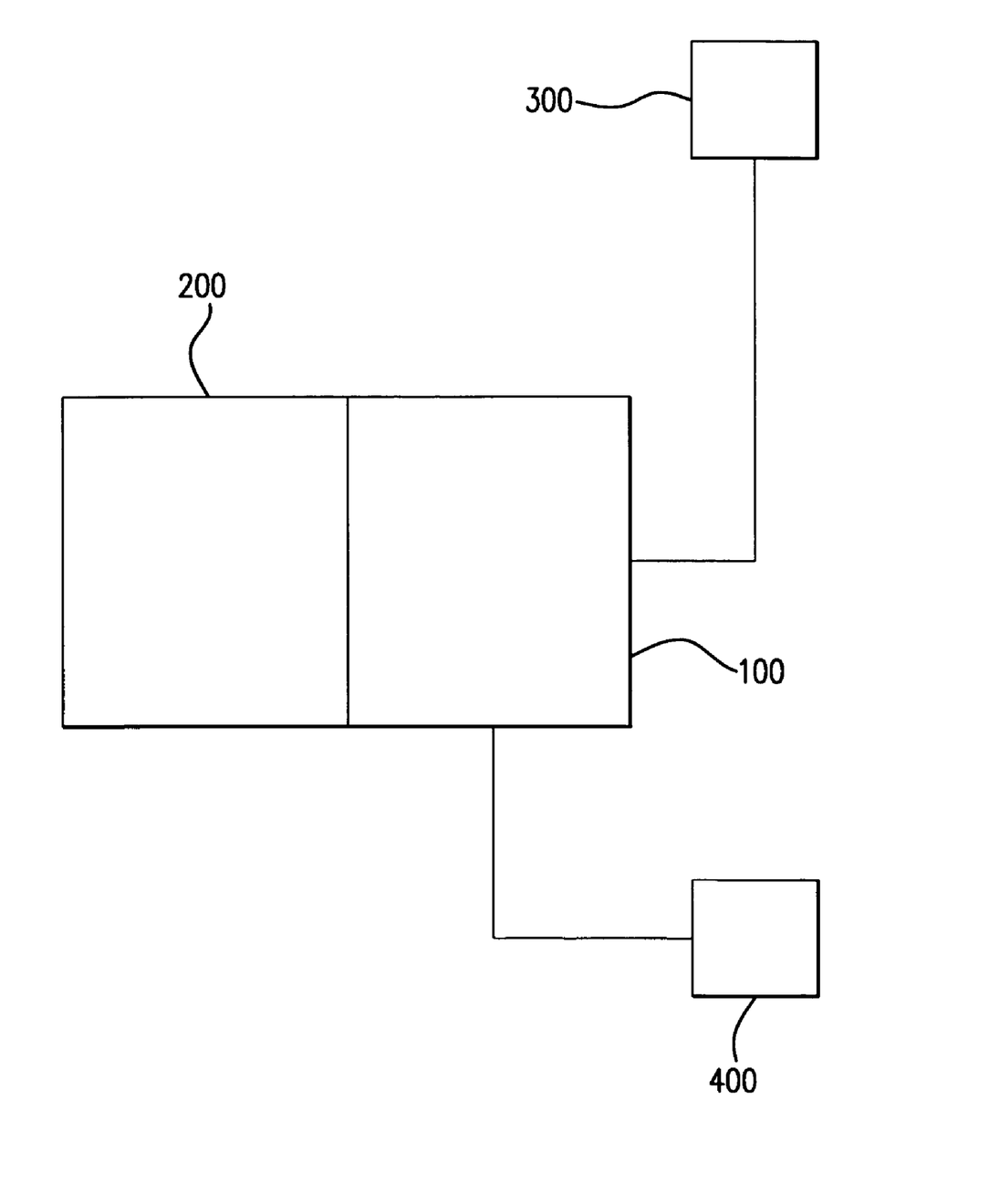
The FIGURE is a schematic of a temperature sensor assembly according to the present invention coupled to a climate control system.

The methods and apparatus for more accurately determining the room temperature of air in a cabin of an automobile (such as but not limited to a car, an SUV, a minivan, a station wagon, a pickup truck, etc.) according to the present invention allow for thermal influences on a temperature sensor inside the cabin to be taken into account, thus resulting in a more accurate determination of room (cabin) temperature. In the first embodiment of the invention, an air temperature value, "Tair," measured by an air temperature sensor inside the cabin of the automobile is automatically obtained. This temperature is then adjusted to account for thermal influences, such as, for example, influence of the air from a conditioned air outlet vent and/or influence of the temperature of mass surrounding the temperature sensor, that create a deviation between the measured temperature, Tair, and the room temperature, to better determine the room temperature. How Tair is adjusted to determine the room temperature of air in the automobile according to the present invention will now be discussed by way of developing equations/relations between various climate variables that may be used to formulate yet another equation that will permit a more accurate determination of room temperature.

As noted above, the air that is used by a temperature sensor to obtain a temperature value (Tair) of the air may contain a blend of air at the outlet temperature, "Tout," and air at the room temperature. Utilizing a blending factor, which will be defined as "X," representing the fraction of the room temperature air in the air sampled by the temperature sensor, an equation can be developed relating Tair to the room temperature and the outlet temperature:

$$\text{Tair} = X \cdot \text{Troom} + (1-X) \cdot \text{Tout} \quad (1)$$

where "Troom" is the room temperature of the air in the automobile (e.g., 70 degrees F. in the above example) and "Tout" is the temperature of the air leaving the conditioned air outlet vent (e.g., 60 degrees F. in the above example).

Tout may be a lookup function depending on a temperature control system's intended average outlet temperature, thus permitting identification of an appropriate outlet temperature near the interior temperature sensor that may not necessarily match the average system outlet temperature. Further, in some embodiments of the invention, the outlet temperature value for outlet air leaving a conditioned air outlet vent is the outlet temperature value for outlet air leaving the conditioned air outlet vent that most influences the air temperature value measured by the temperature sensor. That is, in some embodiments, some outlets may be located nearby the sensor and the temperature of the outlet air of those particular outlets may dominate the sensor's response, while other outlets located further from the sensor may not influence the sensor as much. A control system according to an embodiment of the present invention may select and deliver a target average outlet temperature, while a temperature of a given outlet will correlate to that average temperature though it may not match that average, temperature. Still further, in other embodiments, Tout may be based on a combination of two or more vents that influence the temperature value. In some embodiments, particular outlets may be located nearby the sensor and their temperature will dominate the sensor's response, while other outlets at a relatively great distance will not bear much influence. This may be used to address instances where control systems configured to select and deliver a target average outlet temperature wile temperatures of a given outlet correlate to that average temperature though not matching the average temperature. Equation (1) may be rewritten to solve for Troom:

$$\text{Troom} = (\text{Tair})/X - (1-X) \cdot (\text{Tout})/X \quad (2)$$

Thus, by utilizing equation (2), the influence of outlet air on the temperature sensor may be accounted for, and the room temperature of the automobile may be more accurately determined.

It is noted that, alternatively, Tout may be obtained by measuring the temperature of air leaving the outlet vent, by, for example, using a temperature sensor located at or very close to the conditioned air outlet vent that supplies outlet air that influences the temperature sensor. Further, the blend factor X may also be obtained from a lookup table and may be a function of airflow and the air distribution location(s) with respect to the temperature sensor.

While in the embodiment discussed above X is the fraction of the room temperature air in the air sampled by the temperature sensor, other equations may be formulated where X is the fraction of the outlet air in the Tair sampled by the temperature sensor. Indeed, some embodiments of the present invention may be practiced by formulating equations utilizing any fraction that will represent the blend of the outlet air and/or the room temperature air with respect to the air sampled by the temperature sensor to measure Tair.

Temperature of the Mass Surrounding the Temperature Sensor

As noted above, the temperature of mass surrounding the temperature sensor that effectively influences the measured temperature of air by the temperature sensor may also be accounted for to more accurately determine the room temperature inside the cabin of the automobile. By effectively influence, it is meant that the temperature of the mass exchanges a sufficient amount of heat with the air sampled by the temperature sensor that the temperature of the air is sufficiently different from the room temperature, such that an automatic climate control system relying on temperature measurements from the sensor would overshoot or undershoot a target temperature. The effect of the temperature difference between the mass surrounding the temperature sensor and the air sampled by the air temperature sensor and/or the room temperature air on the air sampled by the temperature sensor may be determined utilizing a local heat transfer convection coefficient and area product, "HA" and the product of the mass flow rate and the enthalpy for the air sampled (used) by the sensor, "mCp." "HA" and "mCp" may be determined by empirical testing and/or by estimating values based on known qualities of air and materials and/or by any other effective means of accurately determining values for these variables.

Using HA and mCp, an energy balance equation for local heat capacitance effects is developed based on the difference between the temperature of the mass surrounding the temperature sensor, "Tsurr," and the temperature of the air sampled by the temperature sensor, Tair, and the difference between the temperature measured by the temperature sensor, "TICS," and the temperature of the air sampled by the temperature sensor, Tair. This energy balance equation is shown below:

$$(HA) \cdot (Tsurr - Tair) = (mCp) \cdot (TICS - Tair) \quad (3)$$

Solving for Tair yields equation (4) shown below:

$$Tair = [TICS - (HA/mCp) \cdot Tsurr]/(1 - HA/mCp) \quad (4)$$

Equation (4) can be inserted into equation (2) to obtain equation (5), shown below, which may be used to more accurately determine the room temperature in the cabin of an automobile by taking into account the temperature of the mass surrounding the temperature sensor as well as the influence of the air from the conditioned air outlets on the temperature sensor.

$$Troom = (1/X) \cdot [TICS - (HA/mCp) \cdot Tsurr]/(1 - HA/mCp) - (1 - X) \cdot Tout/X \quad (5)$$

To utilize equation (5), the temperature of mass surrounding the temperature sensor, Tsurr, must be obtained. Obtaining the temperature of the mass may be done either by actually measuring the temperature or by estimating the temperature, or by a combination of actual measurements and estimates.

In one embodiment of the present invention, an actual measurement of the temperature of mass may be accomplished utilizing a thermocouple or thermistor in conductive heat transfer communication with the mass. In other embodiments where the mass substantially contracts and expands as a result of a temperature change, an insulated strain gauge may be used, and, based on the strain measured in the gauge, the temperature of the mass may be obtained. Indeed, infra red might be used as well. Any method of determining the temperature may be used to obtain the temperature of the mass.

As noted above, the temperature of the mass surrounding the temperature sensor, Tsurr, in some embodiments of the present invention, may be determined by estimating Tsurr. That is, the present invention may be practiced without actually measuring the temperature of the mass surrounding the temperature sensor, but instead estimating the temperature of the mass based on known factors that influence the temperature of the mass in a predictable manner. One way of estimating the temperature of the mass will now be explained.

In one embodiment of the present invention, Tsurr may be obtained by determining a temperature change in the mass due to known factors, and relying on an accurate assumption of an initial value of Tsurr, an updated value of Tsurr may be estimated. This may be done by first making an assumption as to an initial temperature of the mass and then estimating an increase or decrease of the temperature of the mass based on known variables and/or estimated variables that are known to influence the temperature of the mass.

An initial value for Tsurr may be determined by assuming that, prior to adjusting the climate in the cabin of the automobile (or, alternatively, after a sufficiently long period of time since the climate inside the cabin of an automobile has been changed), the temperature of the mass surrounding the temperature sensor is equal to the temperature of the air measured by the temperature sensor TICS.

The change in temperature of the mass surrounding the temperature sensor might be estimated relying on a time constant, "MC," that is specific to the sensor's location. That is, the time constant "MC" may be used to estimate how the temperature of the mass changes when subjected to a change in room temperature inside the automobile and/or an outlet temperature and/or Tair.

MC may be determined empirically and/or by any other means appropriate.

By way of example, initially, the temperature of the mass surrounding the temperature sensor may be assumed to be equal to the temperature of the air measured by the temperature sensor TICS. Thus, after assuming the initial temperature of the mass, a current temperature of the mass may be estimated by estimating the change in the temperature of the mass surrounding the temperature sensor over a given time interval.

An equation may be developed to determine the change in temperature of the surrounding mass based on heat transfer with the environment around the mass. First, a differential equation may be used to capture the influences of such phenomena as convective heat exchange with the air sampled by the sensor and potential heat being generated by objects in the automobile. Taking into account MC, an differential equation may be written to capture these general influences:

$$MC \cdot dTsurr/dt = q - HA \cdot (Tsurr - Tair)$$

where q=a heat generation term based on heat-generating components onboard the automobile that effectively influence the temperature of solid mass surrounding the temperature sensor (discussed in greater detail below).

Thus, for discrete time step $\Delta t$, $$\Delta Tsurr = [q - HA \cdot (Tsurr - Tair)] \cdot \Delta t / MC,$$

where $\Delta t$=a time interval between previously determining Tsurr and currently determining Tsurr.

When combined with equation (3), the above equation can be written as:

$$\Delta Tsurr = [q/MC - mCp/MC \cdot (TICS - Tair)] \cdot \Delta t \quad (6).$$

Equation (7) may be utilized to estimate Tsurr by repeatedly calculating $\Delta Tsurr$ over discrete time intervals and adding the value of $\Delta Tsurr$ to previously determined value of Tsurr, for example, utilizing the equation:

$$Tsurr = Tsurr(\text{previously obtained}) + \Delta Tsurr \quad (7)$$

Equation (7) lends itself to an iterative routine including the following actions:

(a) obtaining a start temperature value for solid mass surrounding the temperature sensor, the start temperature value for solid mass surrounding the temperature sensor being the air temperature value for air measured by the air temperature sensor;

(b) after a predetermined period of time after obtaining the start temperature value, determining an increase or decrease in the temperature value for solid mass surrounding the temperature sensor based on the air temperature value for air measured by the air temperature sensor and the outlet temperature value for outlet air leaving the conditioned air outlet vent;

(c) adding or subtracting the increase or decrease in the temperature value for solid mass surrounding the temperature sensor to the start temperature value to obtain a new temperature value for solid mass surrounding the temperature sensor;

(d) after a predetermined period of time after obtaining the new temperature value for solid mass surrounding the temperature sensor, determining an increase or decrease in the temperature value for the solid mass surrounding the temperature sensor based on the air temperature value for air measured by the air temperature sensor and the outlet temperature value for outlet air leaving the conditioned air outlet vent;

(e) adding or subtracting the increase or decrease in the temperature value for the solid mass surrounding the temperature sensor to the new temperature value to obtain an updated new temperature value for solid mass surrounding the temperature sensor;

(f) repeating actions (d) and (e), where the updated new temperature value for the solid mass surrounding the temperature sensor obtained in action (e) is used as the new temperature value for solid mass surrounding the temperature sensor in action (d).

The predetermined time period may range anywhere from 0.1 seconds to 10 seconds or more. Thus, by starting with an accurate assumption of Tsurr and repeatedly determining a change in Tsurr based on heat exchange with the environmental of the mass, a value for Tsurr may be estimated.

As can be seen from equation (6), the effects of heat generation by components onboard the automobile that generate heat and influence the temperature of the material surrounding the temperature sensor may be taken into account utilizing the heat generation term "q." By way of example and not by way of limitation, a car radio or disc player, interior light, a navigation system, etc., may generate heat and thus influence the temperature of the mass surrounding the temperature sensor. Thus, some embodiments of the invention may be practiced by determining the temperature value for solid mass surrounding the temperature sensor based on heat generated by heat-generating components onboard the automobile that effectively influence the temperature of solid mass surrounding the temperature sensor.

In some embodiments of the present invention the heat generation term q is variable, and may be based on which components are on or off and/or the amount of heat that is generated by the components (which may be a function of the power used by those components). Thus, in some embodiments of the present invention, information as to whether these components are on or off and/or the amount of heat these components are generating may be used to determine the value of the heat generation term utilized to determine ΔTsurr. In some embodiments of the present invention, heat generation terms may be determined empirically, and thus may be stored in a lookup table stored onboard the automobile which may be accessed by, for example, a processor as will be further discussed below.

Recognizing that some components onboard the automobile may be off at some times and on at other times (e.g., the radio may be off) the value of q in equation (6) may be zero, and thus that term would drop out of equation (6).

In some embodiments of the present invention, the effects of the sun load heat flux may also be utilized to determine the temperature of the mass surrounding the temperature sensor, thus further influencing the heat generation term q. In other embodiments of the invention, a separate term for the sun load heat flux may be introduced into equation (6). By way of example only and not by way of limitation, q may represent influence by direct sun load, as indicated, for example, by a sun sensor.

An embodiment that allows for the convergence of ΔTsurr and Tair of equations (6) and (4) is a general means to arrive at a solution for ΔTsurr. For example, ΔTsurr may be solved by utilizing successive substitution with Tair. Still further, other embodiments may use equation (4) to determine Tair, which may be accomplished by using older values of Tsurr and/or the change in Tsurr (from, for example, 5 seconds earlier) to obtain a current value for Tair. Still, it is noted that if calculations are performed fast enough (relative to thermal time constants), convergence may not be necessary in some embodiments. Still further, iteration of variously appropriate equations may be used to obtain a value for Tair.

Mass Flow

It will be readily seen that the above equations rely on the mass flow rate of air sampled by the temperature sensor. Thus, the term mCp in the above equations may be variable based on the type of sensor utilized to obtain Tair. The present invention may be utilized with a variety of temperature sensors, such as, for example, constant mass flow rate temperature sensors (e.g., sensors that utilize a fan to draw air across the sensing element) and variable mass flow rate temperature sensors (e.g., sensors that utilize a venturi to draw air across the sensing element). When using constant mass flow rate temperature sensors, the mass flow rate of the air sampled by the temperature sensor may be substantially constant even when the mass flow rate of the outlet air leaving the conditioned air outlet varies. Thus, a single empirically determined value of mCp may be used in the above equations. In other embodiments of the present invention that utilize variable mass flow rate temperature sensors, the mass flow rate of the air sampled by the temperature sensor may vary in relation to the mass flow rate of the outlet air leaving a conditioned air outlet vent. In embodiments of the present invention that utilize variable mass flow rate temperature sensors, the change in mass flow rate may be addressed by utilizing a variable mCp term, which also may be determined through empirical testing. In such embodiments, an algorithm may be used to determine the value of mCp to be used, based on, for example, the blower speed that blows conditioned air from the conditioned air outlet vent. Thus, variation in mass flow rate of the air sampled by the temperature sensor is taken into account when determining the room temperature of air in the automobile.

Further, in embodiments that utilize a constant mass flow rate temperature sensor, it still may be necessary to utilize a variable value of mCp, since even though the mass flow rate through the sensor is constant, the time that the air "spends"

transferring heat with mass surrounding the temperature sensor may still vary, thus resulting in different values of mCp.

Control Logic

Some embodiments of the present invention may be implemented to automatically determine and/or automatically obtain Troom and/or other variables/constants necessary to determine Troom. Thus, the present invention may be practiced with, for example, an electronic processor.

The present invention includes the method of practicing the invention, software to practice the invention, and apparatuses configured to implement the present invention. An exemplary apparatus for practicing the present invention may be seen in the FIGURE, which shows a schematic representation of a room temperature sensor assembly for more accurately determining the room temperature of air in an automobile. The FIGURE shows an electronic processor 100, which is in communication with a memory 200, which may be a part of the processor 100 or may be separate from the processor 100. The processor 100 may be adapted to automatically determine the room temperature of air in an automobile based on some or all of the variables and/or constants discussed herein. Still further, processor 100 may be adapted to utilize an algorithm based on some or all of the equations, variables, and/or constants discussed herein. Memory 200 may store the variables and/or constants that will be used by the processor to automatically determine the room temperature of air in an automobile. These variables and constants may be stored in look-up tables in the memory. Still further, the memory may store an array of solutions for some or all of the above equations, such that calculations by the processor may be reduced and/or eliminated. Still further, the memory may store solutions to equations in a manner that will permit the room temperature to be determined without iteration (e.g., all the possible solutions for the equations may be stored in the memory, such that all that is necessary is to look-up those solutions based on an array of known values.

Thus, embodiments of the present invention may utilize lookup tables in lieu of and/or in addition to utilizing algorithms based on the equations above. In such embodiments, solutions for a wide range of climate control scenarios (i.e., different variables/constants) may be predetermined and thus stored in a memory, from which these solutions may be looked up based on a provided array of variables. However, other embodiments of the present invention may be practiced utilizing algorithms based on the above equations. Still further, a combination of these may be used to implement the present invention. For example, in some embodiments of the present invention, a memory may store a lookup table and/or an algorithm that may be used to determine the outlet temperature value for outlet air leaving a conditioned air outlet vent based on an intended average outlet temperature. That is, through empirical testing, the temperature of the outlet air that influences the temperature sensor may be identified based on the average outlet temperature at which a climate control system "intends" to supply conditioned air to the cabin of the automobile. In yet other embodiments of the present invention, for example, a memory may include a lookup table and/or an algorithm that is used to determine the blending factor value X.

The FIGURE shows that the processor 100 is in communication with a temperature sensor 300. In the assembly shown, temperature sensor 300 relays temperature information from the sensor to processor 100. Still further, the FIGURE shows that processor 100 is also in communication with climate control system 400, which may send information that the processor needs to determine Troom to the processor (for example, the mass flow rate of air exiting the conditioned air outlets, etc.). As will be discussed below, processor 100 may also communicate the determined value of Troom to the climate control system 400.

The room temperature determined according to the present invention may be used as an input value into a system for automatically controlling the climate in a cabin of an automobile. By way of example only and not by way of limitation, the methods and apparatuses for determining the room temperature according to the present invention may be utilized in a system for automatically controlling a climate in a cabin of an automobile according to U.S. patent application Ser. No. 10/373,202 to Eisenhour, filed on Feb. 26, 2003, entitled, Dual Zone Automatic Climate Control Algorithm Utilizing Heat Flux Analysis, the contents of which is incorporated by reference herein in its entirety. Thus, some embodiments of the present invention include providing conditioned air to the cabin from the conditioned air outlet at outlet temperatures and at mass flow rates determined at least based on the automatically determined room temperature of the air in the automobile according to the present invention. Still further, some embodiments of the invention may be implemented in a system that automatically determines an outlet temperature and a mass flow rate of conditioned air into a cabin to achieve a desired room temperature, where the system then utilizes the determined outlet temperature to confirm that the desired room temperature has been achieved and/or to make further variations to parameters associated with conditioned air being directed into the cabin.

In some embodiments of the present invention, the room temperature of the automobile is determined based on both the influence of air from the outlet vent as well as the temperature of the mass surrounding the temperature sensor. However, other embodiments of the present invention may be practiced by ignoring the effects of the temperature of the mass surrounding the temperature sensor or ignoring the effects of the air from the outlet that influences the temperature sensor.

In yet other embodiments of the present invention, there is an apparatus for automatically controlling the climate in a cabin of an automobile which includes a room temperature sensor assembly configured to determine room temperature according to the present invention, and an air conditioning device adapted to provide conditioned air to the cabin from a conditioned air outlet vent at an outlet temperature and/or mass flow rate determined at least based on the room temperature determined utilizing the room temperature assembly.

It is further noted that the methods and apparatus for more accurately determining the room temperature of air may be applied to other vehicles as well, such as trucks, airplanes, ships, trains, hovercraft, etc.

When using the term "conditioned air" herein, it is meant air that is heated and/or cooled. That is, air that has been conditioned in some manner to have a different temperature than the ambient air.

Further, when referring to an algorithm based on the above equations, it is meant any routine or equation(s) that may be derived or extrapolated from the above equations, including equations developed (or similar equations) to formulate other equations (e.g., equations 2 and 4 in view of equation 5.)

By practicing the present invention, costly correction efforts may be avoided, such as extensive development of time consuming empirical correction factors.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A method of more accurately determining the room temperature of air in an automobile cabin by a temperature sensor, comprising:
   automatically determining the room temperature of air in an automobile based on an air temperature value for air measured by the air temperature sensor which has been adjusted based upon at least one of the following factors:
   a) a temperature value for solid mass surrounding the temperature sensor; and
   b) an outlet temperature value for outlet air leaving a conditioned air outlet vent and a blending factor value based on estimated percentages of room temperature air and outlet air present in the air measured by the air temperature sensor.

2. The method of claim 1, wherein the outlet temperature value for outlet air leaving a conditioned air outlet vent is the outlet temperature value for outlet air leaving a conditioned air outlet vent that most influences the air temperature value measured by the temperature sensor.

3. The method of claim 1, wherein adjustment is based on both factors and further comprising:
   automatically obtaining the temperature value for the solid mass surrounding the temperature sensor;
   automatically obtaining the outlet temperature value for outlet air leaving the conditioned air outlet vent;
   automatically obtaining the air temperature value for air measured by the air temperature sensor; and
   automatically obtaining the blending factor value based on the estimated percentages of room temperature air and outlet air present in the air sampled by the air temperature sensor.

4. The method of claim 1, wherein automatically determining the room temperature of air in an automobile is further based on a local heat transfer convection coefficient of the solid mass surrounding the temperature sensor.

5. The method of claim 1, wherein automatically determining the room temperature of air in an automobile is further based on an area of the solid mass surrounding the temperature sensor that influence the air temperature value for air measured by the air temperature sensor.

6. The method of claim 1, wherein automatically determining the room temperature of air in an automobile is further based on a local heat transfer convection coefficient and an area product of solid mass surrounding the temperature sensor.

7. The method of claim 1, wherein automatically determining the room temperature of air in an automobile is further based on a product of the mass flow rate and the enthalpy of air sampled by the temperature sensor.

8. The method of claim 7, wherein the mass flow rate of the air sampled by the temperature sensor is substantially constant when the mass flow rate of the outlet air leaving the conditioned air outlet varies.

9. The method of claim 7, wherein the mass flow rate of the air sampled by the temperature sensor varies in relation to the mass flow rate of the outlet air leaving a conditioned air outlet, and wherein the variation in mass flow rate of the air sampled by the temperature sensor is taken into account when automatically determining the room temperature of air in the automobile.

10. The method of claim 7, wherein the product of the mass flow rate and the enthalpy of air sampled by the temperature sensor is substantially independent of a variation in the mass flow rate of the outlet air leaving the conditioned air outlet.

11. The method of claim 1, further comprising automatically determining the temperature value for solid mass surrounding the temperature sensor based on heat generated by heat-generating components onboard the automobile that effectively influence the temperature of solid mass surrounding the temperature sensor.

12. The method of claim 1, further comprising automatically determining the temperature value for solid mass surrounding the temperature sensor based on a thermal time constant of solid mass surrounding the temperature sensor.

13. The method of claim 1, further comprising automatically determining the temperature value for solid mass surrounding the temperature sensor based on heat generated by heat-generating components on the automobile that effectively influence the temperature of solid mass surrounding the temperature sensor and a thermal time constant of the solid mass surrounding the temperature sensor.

14. The method of claim 1, further comprising automatically determining the temperature value for solid mass surrounding the temperature sensor based on a product of the mass flow rate and the enthalpy of air sampled by the temperature sensor.

15. The method of claim 1, further comprising automatically determining the temperature value for solid mass surrounding the temperature sensor based on a blending factor value, the blending factor value being based on the estimated percentages of room temperature air and outlet air present in the air measured by the air temperature sensor.

16. The method of claim 1, further comprising automatically determining the temperature value for solid mass surrounding the temperature sensor based on the air temperature value for air measured by the air temperature sensor.

17. The method of claim 1, further comprising automatically determining the temperature value for solid mass surrounding the temperature sensor utilizing an iterative routine, the iterative routine including the following actions:
   (a) obtaining a start temperature value for solid mass surrounding the temperature sensor, the start temperature value for solid mass surrounding the temperature sensor being the air temperature value for air measured by the air temperature sensor;
   (b) after a predetermined period of time after obtaining the start temperature value, determining an increase or decrease in the temperature value for solid mass surrounding the temperature sensor based on the air temperature value for air measured by the air temperature sensor and the outlet temperature value for outlet air leaving the conditioned air outlet vent;
   (c) adding or subtracting the increase or decrease in the temperature value for solid mass surrounding the temperature sensor to the start temperature value to obtain a new temperature value for solid mass surrounding the temperature sensor;

(d) after a predetermined period of time after obtaining the new temperature value for solid mass surrounding the temperature sensor, determining an increase or decrease in the temperature value for the solid mass surrounding the temperature sensor based on the air temperature value for air measured by the air temperature sensor and the outlet temperature value for outlet air leaving the conditioned air outlet vent;

(e) adding or subtracting the increase or decrease in the temperature value for the solid mass surrounding the temperature sensor to the new temperature value to obtain an updated new temperature value for solid mass surrounding the temperature sensor;

(f) repeating actions (d) and (e), where the updated new temperature value for the solid mass surrounding the temperature sensor obtained in action (e) is used as the new temperature value for solid mass surrounding the temperature sensor in action (d).

18. The method of claim 1, wherein automatically determining the room temperature of air in an automobile is further based on the effects of sun load heat flux.

19. A method for automatically controlling the climate in a cabin of an automobile, comprising:
automatically determining the room temperature of air in the automobile according to claim 1; and
providing conditioned air to the cabin from the conditioned air outlet vent at an outlet temperature and mass flow rate determined at least based on the automatically determined room temperature of air in the automobile.

20. A method for automatically controlling the climate in a cabin of an automobile, comprising:
automatically determining the room temperature of air in the automobile according to claim 1;
automatically determining an outlet temperature and a mass flow rate of conditioned air to be provided to the cabin based on at least the automatically determined room temperature of the air in the automobile; and
providing conditioned air to the cabin from the conditioned air outlet vent at the automatically determined outlet temperature and mass flow rate.

21. A method of more accurately determining the room temperature of air in an automobile cabin, the method comprising:
utilizing an algorithm relating to at least the equation:

$$\text{Troom}=(1/X)\cdot[\text{TICS}-(HA/mCp)\cdot\text{Tsurr}]/(1-HA/mCp)-(1-X)\cdot\text{Tout}/X$$

where:
Troom=the room temperature of air in an automobile,
TICS=an air temperature value for air measured by an air temperature sensor,
Tsurr=a temperature value for solid mass surrounding a temperature sensor,
Tout=an outlet temperature value for outlet air leaving a conditioned air outlet vent,
X=a blending factor value based on estimated percentages of room temperature air and outlet air present in the air measured by the air temperature sensor,
HA=a local heat transfer convection coefficient and an area product of the solid mass surrounding the temperature sensor, and
mCp=a product of the mass flow rate and the enthalpy of air sampled by the temperature sensor; and
automatically determining Troom by solving the above equation.

22. The method of claim 21, wherein Tsurr is determined utilizing an algorithm relating to at least the equation:

$$\text{Tsurr}=\text{Tsurr(previously obtained)}+\Delta\text{Tsurr}$$

where,
Tsurr(previously obtained)=a value of Tsurr previously obtained, and $$\Delta\text{Tsurr}=[q/MC-mCp/MC\cdot(\text{TICS}-T\text{air})]\cdot\Delta t$$

where,
q=a heat generation term based on heat-generating components onboard the automobile that effectively influence the temperature of solid mass surrounding the temperature sensor,
MC=a thermal time constant of solid mass surrounding the temperature sensor, $$\text{Tair}=X\cdot\text{Troom}+(1-X)\cdot\text{Tout, and}$$

Δt=a time interval between previously determining Tsurr and currently determining Tsurr.

23. The method of claim 22, wherein q is a variable value based on whether at least one heat-generating component onboard the automobile that effectively influences the temperature of solid mass surrounding the temperature sensor is on or off.

24. The method of claim 22, wherein Tair is determined utilizing a previously determined value of Troom.

25. The method of claim 22, wherein the equation for Troom is determined through iteration of the values for Troom in the equations for Troom and the equation for Tair.

26. The method of claim 22, wherein Δt is a time period from between 0.1 seconds and 10 seconds.

27. The method of claim 26, wherein Δt is a time period from between 0.1 seconds and 5 seconds.

28. A method for more accurately determining the room temperature of air in an automobile cabin, comprising:
automatically determining the room temperature of air in an automobile cabin by adding or subtracting an error value to/from a temperature value of air measured by an air temperature sensor, the error value being based on a temperature value for solid mass surrounding a temperature sensor.

29. The method of claim 28, wherein the error value is based on a local heat transfer convection coefficient of the solid mass surrounding the temperature sensor.

30. A method for more accurately determining the room temperature of air in an automobile cabin, comprising:
automatically determining the room temperature of air in an automobile cabin by adding or subtracting an error value to/from a temperature value of air measured by an air temperature sensor, the error value being based on an outlet temperature value for outlet air leaving a conditioned air outlet vent and a blending factor value based on estimated percentages of room temperature air and outlet air present in the air measured by the air temperature sensor.

31. The method of claim 30, wherein the error value is based on a local heat transfer convection coefficient of the solid mass surrounding the temperature sensor.

32. A room temperature sensor assembly for more accurately determining the room temperature of air in an automobile cabin, comprising:
an electronic processor, wherein the processor is adapted to automatically determine the room temperature of air in an automobile based on an air temperature value for air measured by an air temperature sensor which has been adjusted based upon at least one of the following factors:

a) a temperature value for solid mass surrounding the temperature sensor; and b) an outlet temperature value for outlet air leaving a conditioned air outlet vent and a blending factor value based on estimated percentages of room temperature air and outlet air present in the air measured by the air temperature sensor.

33. The assembly of claim 32, further comprising a memory in which is stored:

at least one of a look-up table and an algorithm to determine the outlet temperature value for outlet air leaving the conditioned air outlet vent based on an intended average outlet temperature; and at least one of a look-up table and an algorithm to determine the blending factor value based on the estimated percentages of room temperature air and outlet air present in the air sampled by the air temperature sensor.

34. The assembly of claim 32, wherein the processor is further adapted to automatically determine the room temperature of air in an automobile based on a local heat transfer convection coefficient and area product od solid mass surrounding the temperature sensor.

35. The assembly of claim 32, wherein the processor is further adapted to automatically determine the room temperature of air in an automobile based on a product of the mass flow rate and the enthalpy of air sampled by the temperature sensor.

36. The assembly of claim 32, wherein the processor is further adapted to automatically determine the temperature value for solid mass surrounding the temperature sensor based on heat generated by heat-generating components onboard the automobile that effectively influence the temperature of the solid mass surrounding the temperature sensor.

37. The assembly of claim 32, wherein the processor is further adapted to automatically determine the temperature value for the solid mass surrounding the temperature sensor based on a thermal time constant of the solid mass surrounding the temperature sensor.

38. The assembly of claim 32, wherein the processor is further adapted to automatically determine the temperature value for solid mass based on heat generated by heat-generating components on the automobile that effectively influence the temperature of the solid mass surrounding the temperature sensor and a thermal time constant of solid mass surrounding the temperature sensor.

39. The assembly of claim 32, wherein the processor is further adapted to automatically determine the temperature value for the solid mass surrounding the temperature sensor based on a blending factor value based on an estimated percentage of room temperature air and outlet air present in the air measured by the air temperature sensor.

40. The assembly of claim 32, wherein the processor is further adapted to automatically determine the temperature value for the solid mass surrounding the temperature sensor based on the air temperature value for air measured by the air temperature sensor.

41. The assembly of claim 32, wherein the processor is adapted to execute an iterative routine for automatically determining the temperature value for the solid mass surrounding the temperature sensor, the iterative routine including the following actions:

(a) obtaining a start temperature value for solid mass surrounding the temperature sensor, the start temperature value for solid mass surrounding the temperature sensor being the air temperature value for air measured by the air temperature sensor;

(b) after a predetermined period of time after obtaining the start temperature value, determining an increase or decrease in the temperature value for solid mass surrounding the temperature sensor based on the air temperature value for air measured by the air temperature sensor and the outlet temperature value for outlet air leaving the conditioned air outlet vent;

(c) adding or subtracting the increase or decrease in the temperature value for solid mass surrounding the temperature sensor to the start temperature value to obtain a new temperature value for solid mass surrounding the temperature sensor;

(d) after a predetermined period of time after obtaining the new temperature value for solid mass surrounding the temperature sensor, determining an increase or decrease in the temperature value for solid mass surrounding the temperature sensor based on the air temperature value for air measured by the air temperature sensor and the outlet temperature value for outlet air leaving the conditioned air outlet vent;

(e) adding or subtracting the increase or decrease in the temperature value for solid mass surrounding the temperature sensor to the new temperature value to obtain an updated new temperature value for solid mass surrounding the temperature sensor;

(f) repeating actions (d) and (e), where the updated new temperature value for the solid mass surrounding the temperature sensor obtained in action (e) is used as the new temperature value for solid mass surrounding the temperature sensor in action (d).

42. The assembly of claim 32, wherein the processor is in electronic communication with the temperature sensor, and wherein the temperature sensor is adapted to control the mass flow rate of the air sampled by the temperature sensor so that the mass flow rate is substantially constant when the mass flow rate of the outlet air leaving the conditioned air outlet varies.

43. The assembly of claim 32, wherein the processor is in electronic communication with a temperature sensor, and wherein the temperature sensor is adapted to control the mass flow rate of the air use by the temperature sensor so that the product of the mass flow rate and the enthalpy of air sampled by the temperature sensor is substantially independent of a variation in the mass flow rate of the outlet air leaving the conditioned air outlet.

44. An apparatus for automatically controlling the climate in a cabin of an automobile, comprising:

a room temperature sensor assembly according to claim 32; and an air conditioning device adapted to provide conditioned air to the cabin from the conditioned air outlet vent at an outlet temperature and mass flow rate determined at least based on an automatically determined room temperature of air in the automobile determined by the processor.

45. An apparatus for automatically controlling the climate in a cabin of an automobile, comprising:

a room temperature sensor assembly according to claim 32; wherein the processor is further adapted to automatically determine an outlet temperature and a mass flow rate of conditioned air to be provided to the cabin based on at least an automatically determined room temperature of the air in the automobile determined by the processor; the apparatus further comprising an air conditioning device adapted to provide conditioned air to the cabin from the conditioned air outlet vent at the automatically determined outlet temperature and mass flow rate determined by the processor.

46. An automobile having the assembly of claim 30.

47. A room temperature sensor assembly for more accurately determining the room temperature of air in an automobile cabin, comprising:

an electronic processor and a memory, wherein the memory stores at least one algorithm based on an equation to automatically determine the room temperature of air in an automobile, the equation being based on variables including:

an air temperature value for air measured by an air temperature sensor, a temperature value for solid mass surrounding a temperature sensor, an outlet temperature value for outlet air leaving a conditioned air outlet vent, a blending factor value based on estimated percentages of room temperature air and outlet air present in the air measured by the air temperature sensor, a local heat transfer convection coefficient and an area product of the solid mass surrounding the temperature sensor, a product of the mass flow rate and the enthalpy of air sampled by the temperature sensor; wherein the electronic processor is adapted to automatically determine the room temperature of air in an automobile utilizing the algorithm.

48. The room temperature sensor of claim 45, wherein the memory further stores a second algorithm based on an equation to automatically determine the temperature value for solid mass surrounding a temperature sensor, the equation to automatically determine the temperature value for solid mass surrounding a temperature sensor being based on variables including:

a value of the temperature for solid mass surrounding the temperature sensor previously obtained, a heat generation term based on heat-generating components onboard the automobile that effectively influence the temperature of the solid mass surrounding the temperature sensor, a thermal time constant of the solid mass surrounding the temperature sensor, and a predetermined time interval; and wherein the electronic processor is adapted to automatically determine a temperature value for solid mass surrounding a temperature sensor utilizing the second algorithm.

49. A program product for more accurately determining the room temperature of air in an automobile comprising machine-readable program code for causing, when executed, a machine to perform the following method actions:

automatically determining the room temperature of air in an automobile based on an air temperature value for air measured by an air temperature sensor which has been adjusted based upon at least one of the following factors:

a) a temperature value for solid mass surrounding a temperature sensor; and b) an outlet temperature value for outlet air leaving a conditioned air outlet vent and a blending factor value based on estimated percentages of room temperature air and outlet air present in the air measured by the air temperature sensor.

50. The program product claim 49, wherein, when executed, the machine also performs the following method actions:

automatically obtaining the temperature value for the solid mass surrounding the temperature sensor;

automatically obtaining the outlet temperature value for outlet air leaving the conditioned air outlet vent;

automatically obtaining the air temperature value for air measured by the air temperature sensor; and automatically obtaining the blending factor value based on the estimated percentages of room temperature air and outlet air present in the air sampled by the air temperature sensor.

51. The program product of claim 49, wherein automatically determining the room temperature of air in an automobile is further based on a local heat transfer convection coefficient of the solid mass surrounding the temperature sensor.

52. A means for more accurately determining the room temperature of air in an automobile cabin, comprising:

a means for automatically determining the room temperature of air in an automobile based on:

a temperature value for solid mass surrounding a temperature sensor;

an outlet temperature value for outlet air leaving a conditioned air outlet vent;

an air temperature value for air measured by an air temperature sensor; and a blending factor value based on estimated percentages of room temperature air and outlet air present in the air measured by the air temperature sensor.

53. The means for more accurately determining the room temperature of air in an automobile cabin according to claim 52, further comprising:

a means for automatically obtaining the temperature value for the solid mass surrounding the temperature sensor;

a means for automatically obtaining the outlet temperature value for outlet air leaving the conditioned air outlet vent;

a means for automatically obtaining the air temperature value for air measured by the air temperature sensor; and a means for automatically obtaining the blending factor value based on the estimated percentages of room temperature air and outlet air present in the air sampled by the air temperature sensor.

* * * * *